(12) United States Patent
Kwon et al.

(10) Patent No.: US 12,642,635 B2
(45) Date of Patent: Jun. 2, 2026

(54) AMPOULE FOR IMPLANT STORAGE HAVING BI-DIRECTIONAL HUMIDITY MAINTENANCE FUNCTION

(71) Applicant: OSSTEM IMPLANT CO., LTD., Seoul (KR)

(72) Inventors: Young Joong Kwon, Seoul (KR); Ju Dong Song, Busan (KR); Il Seok Jang, Yangsan-si (KR)

(73) Assignee: OSSTEM IMPLANT CO., LTD., Seoul (KR)

( * ) Notice: Subject to any disclaimer, the term of this patent is extended or adjusted under 35 U.S.C. 154(b) by 11 days.

(21) Appl. No.: 18/725,766

(22) PCT Filed: Dec. 28, 2022

(86) PCT No.: PCT/KR2022/021553
§ 371 (c)(1),
(2) Date: Jun. 29, 2024

(87) PCT Pub. No.: WO2023/128629
PCT Pub. Date: Jul. 6, 2023

(65) Prior Publication Data
US 2025/0099218 A1 Mar. 27, 2025

(30) Foreign Application Priority Data

Dec. 29, 2021 (KR) ......................... 10-2021-0191645
Dec. 28, 2022 (KR) ......................... 10-2022-0187628

(51) Int. Cl.
*A61C 8/00* (2006.01)
*A61C 19/02* (2006.01)
(52) U.S. Cl.
CPC .................................. *A61C 19/02* (2013.01)

(58) Field of Classification Search
CPC ........ A61L 2400/18; A61L 27/10; A61L 2/26;
A61L 2430/02; A61L 2430/12;
(Continued)

(56) References Cited

U.S. PATENT DOCUMENTS 5,960,956 A 10/1999 Langanki et al.
6,247,932 B1 6/2001 Sutter
(Continued)

FOREIGN PATENT DOCUMENTS

JP 2000512194 A 9/2000
JP 2000512195 A 9/2000
KR 20130028508 A 3/2013

*Primary Examiner* — King M Chu
(74) *Attorney, Agent, or Firm* — McCarter & English, LLP; Hyunho Park

(57) ABSTRACT

The present invention relates to an ampoule for implant storage and, more particularly, to an ampoule for implant storage with a function of bidirectional humidity maintenance that can suppress excessive moisture supply from a hydrophilic carrier in the ampoule to the implant surface, thereby solving the problem of the coating solution coming off due to external impacts. The ampoule for implant storage with a function of bidirectional humidity maintenance according to the present invention includes an ampoule container and a separator, which is accommodated in the ampoule container. The separator separates the inside of the ampoule container into a first space and a second space and has at least one through hole that allows moisture to move between the first and second spaces. An implant is accommodated in the first space and has a hydrophilic coating layer formed on at least a portion of the surface thereof. A hydrophilic carrier is accommodated in the second space and supplies moisture to the hydrophilic coating layer formed on the implant surface. Since the hydrophilic coating layer on the implant surface and the hydrophilic carrier contain one or more organic zwitterionic buffering materials having a (Continued)

sulfonic acid group, a moisture balance is maintained therebetween.

11 Claims, 7 Drawing Sheets

(58) Field of Classification Search
CPC ... A61L 2/0092; A61C 8/0013; A61C 8/0012;
A61C 8/0087; C08L 1/28; C08L 29/04;
C08L 71/00; C08L 33/02; C08L 101/14
USPC ................................. 433/173; 206/205, 63.5
See application file for complete search history.

(56) References Cited

U.S. PATENT DOCUMENTS

| | | | |
|---|---|---|---|
| 6,261,097 B1 | 7/2001 | Schmutz et al. | |
| 9,517,115 B2 * | 12/2016 | Chung ................. | A61C 8/0013 |
| 2010/0243485 A1 * | 9/2010 | Sato .................... | A61C 8/0087 |
| | | | 206/63.5 |
| 2014/0166509 A1 * | 6/2014 | Chung ................. | A61C 8/0087 |
| | | | 206/205 |

* cited by examiner

MOISTURE

SOME TIME LATER

MOISTURE (a)                    (b)

| a | PEELING OF COATING SOLUTION | PRECIPITATION OF COATING SOLUTION | b | PEELING OF COATING SOLUTION | PRECIPITATION OF COATING SOLUTION | c | PEELING OF COATING SOLUTION | PRECIPITATION OF COATING SOLUTION |
|---|---|---|---|---|---|---|---|---|
| 1:0 | O | X | 1:0.54 | X | X | 1:1.2 | X | O |
| 1:0.21 | O | X | 1:0.63 | X | X | | | |
| 1:0.42 | O | X | 1:0.83 | X | X | | | |
| | | | 1:0.91 | X | X | | | |

PEELING OF COATING SOLUTION
(a)

MOISTURE BALANCE MAINTENANCE
(b)

PRECIPITATION OF COATING SOLUTION SALT
(c)

AMPOULE FOR IMPLANT STORAGE HAVING BI-DIRECTIONAL HUMIDITY MAINTENANCE FUNCTION

CROSS-REFERENCE TO RELATED APPLICATIONS

This application is a National Stage of International patent application PCT/KR2022/021553, filed on Dec. 28, 2022, which claims priority of foreign Korean patent application No. KR 10-2021-0191645, filed on Dec. 29, 2021 and KR 10-2022-0187628, filed on Dec. 28, 2022, the disclosures of which are hereby incorporated by reference in their entireties.

TECHNICAL FIELD

The present invention relates to a dental implant.

BACKGROUND ART

Since dental implants (hereinafter simply referred to as "implants") are artificial structures, which can permanently replace missing teeth, they need to functionally serve as real teeth. In addition, they have to be manufactured to properly distribute the load applied to the teeth during mastication so that they can be used for a long time, and for cosmetic purposes, they are required to be delicately crafted so that they have a shape and a color that are not much different from real teeth.

Implants are transplanted and fixed into the living tissue of the oral cavity, that is, the alveolar bone, but as time passes after being transplanted in the body, the metal ions of the metal implant are eluted due to tissue fluids or body fluids in the body or the contact and friction with biological tissue, causing the implant to corrode. Since the metal ions eluted from the metal implant may damage macrophages or invade cells in the body and cause inflammatory cells or giant cells, the implant needs to have excellent biocompatibility.

Although attempts have been made to develop implant materials using various metals and alloys, titanium metal or its alloys, which have high biocompatibility with human biological tissue, high mechanical strength, and bioinertness, are mainly being used.

Meanwhile, a method of increasing the surface roughness of the implant to expand the surface area that comes in contact with biological tissue is being used to ensure stable osseointegration of the implant in vivo. Sandblasting with large grit and acid treatment (SA), a representative treatment method of increasing the surface area of implants, is a method that blasts $Al_2O_3$ particles on the implant surface to create craters and micro-pits and then treating them with a strong acid ($H_2SO_4$/HCl), and the SA method had an effect of increasing the surface area by 40% or more compared to the existing resorbable blasting media (RBM), and thus implants manufactured by the SA method shortened the average recovery period after the implant procedure from 12 weeks to 6 to 8 weeks.

However, the hydrophilic titanium surface treated by the SA method has a disadvantage of being rapidly hydrophobicized due to irreversible adsorption of carbon contaminants in the air. Since the hydrophobized surface hinders the influx of osteocytes to the implant surface and reduces the contact rate between the bone and the implant from the initial period of the implant procedure, it can be a potential cause of early implant failure.

Therefore, countermeasures have been taken to prevent the surface of titanium implants manufactured by the SA method from being hydrophobicized in the air and to maintain hydrophilicity. A representative example thereof is to block air by placing titanium implants in a container filled with water or inert gas and package them.

The above packaging method is quite effective in maintaining the hydrophilic surface of titanium implants. FIG. 1 shows the related art for maintaining the hydrophilicity of the titanium implant surface, in which there are two spaces at the top and bottom of the implant packaging ampoule 10, an implant 12 is accommodated at the bottom, and a moisture supply part 11 is accommodated at the top so that moisture discharged from the moisture supply part 11 is supplied to the implant surface.

However, considering the recent direction of implant development, the related art may have limitations of its use. In other words, the recent trend in implant development is to shorten the time for implant procedures by coating the implant surface with chemicals, peptides, or proteins that can promote osseointegration, but it has not been verified what effect these materials will have on the coating layer when the coated implant is covered with water. Therefore, if they have a negative effect, there is a need to find another packaging medium to solve this problem.

In addition, in the related art in FIG. 1, when excessive moisture is supplied from the moisture supply part 11, an excessive amount of water is applied around the implant surface, which ultimately causes a problem in that the coating solution comes off due to external impacts.

RELATED ART DOCUMENT

Korean Patent Publication No. 10-1283490 (Jul. 2, 2013)

DISCLOSURE

Technical Problem

The technical problem to be solved by the present invention is to provide an ampoule for implant storage with a function of bidirectional humidity maintenance, which can prevent degradation in appearance-related quality due to the coating solution coming off the implant surface and scattering onto the interior surfaces of the ampoule.

Technical Solution

In order to solve the above problem, an ampoule for implant storage with a function of bidirectional humidity maintenance according to one aspect of the present invention includes: an ampoule container coupled to an ampoule cap; a separator configured to separate the inside of the ampoule container into a first space and a second space having at least one through hole that allows moisture to move between the first space and the second space; an implant accommodated in the first space and having a hydrophilic coating layer formed on at least a portion of the surface thereof; and a hydrophilic carrier accommodated in the second space and containing a buffering material and moisture, wherein as the buffering material of the hydrophilic carrier supplies moisture to the hydrophilic coating layer on the implant surface or absorbs moisture from the hydrophilic coating layer on the implant surface, a moisture balance is maintained between the hydrophilic coating layer on the implant surface and the hydrophilic carrier.

The hydrophilic carrier may be formed by supporting the buffering material and moisture on a highly hygroscopic polymer material.

The highly hygroscopic polymer material may be one or more polymer materials selected from polyacrylic acid, polyvinyl alcohol, polyethylene glycol, carboxymethyl cellulose, and hyaluronic acid.

The buffering material contained in the hydrophilic carrier may be one or more organic zwitterionic buffering materials selected from the group consisting of ACES, BES, CHES, HEPES, MOPS, PIPES, and TES.

The buffering material contained in the hydrophilic coating layer on the implant surface may be one or more organic zwitterionic buffering materials selected from the group consisting of ACES, BES, CHES, HEPES, MOPS, PIPES, and TES.

The hydrophilic coating layer on the implant surface may contain the buffering material, and the concentration of the buffering material contained in the hydrophilic carrier may be lower than that of the buffering material contained in the hydrophilic coating layer on the implant surface.

An ampoule for implant storage with a function of bidirectional humidity maintenance according to another aspect of the present invention includes: an ampoule container that may be sealed airtight; a separator configured to separate the inside of the ampoule container into a first space and a second space and having at least one through hole that allows moisture to move between the first space and the second space; and a hydrophilic carrier accommodated in the second space and configured to supply moisture to a hydrophilic coating layer formed on an implant surface, wherein as the hydrophilic coating layer on the implant surface and the hydrophilic carrier contain one or more organic zwitterionic buffering materials having a sulfonic acid group, a moisture balance is maintained between the hydrophilic coating layer on the implant surface and the hydrophilic carrier.

The hydrophilic carrier may be formed by supporting a buffering material and moisture on a highly hygroscopic polymer material.

The highly hygroscopic polymer material may be one or more polymer materials selected from polyacrylic acid, polyvinyl alcohol, polyethylene glycol, carboxymethyl cellulose, and hyaluronic acid.

The buffering material contained in the hydrophilic carrier may be one or more organic zwitterionic buffering materials selected from the group consisting of ACES, BES, CHES, HEPES, MOPS, PIPES, and TES.

Advantageous Effects

According to the present invention having the above-described composition, by adding HEPES, a zwitterionic buffering material, to polyacrylic acid, the hydrophilic carrier in the ampoule for implant storage, both the implant surface and the hydrophilic carrier have the property of attracting water within the ampoule for implant storage, and thus the prevent invention can suppress excessive moisture supply to the implant surface that may occur due to the existing unidirectional moisture supply and create optimal conditions in which both the implant surface and the hydrophilic carrier maintain a moisture balance.

In addition, as an excessive amount of moisture is supplied due to the existing unidirectional moisture supply from the moisture source to the implant surface, the coating solution comes off the implant surface and is scattered onto the interior surface of the ampoule due to physical impacts while the ampoule is transported and delivered, making it appear as if the implant is contaminated, but the present invention can prevent such degradation in appearance-related quality.

DESCRIPTION OF DRAWINGS

FIG. 6 is a graph of comparing the moisture balance stability according to the HEPES concentration of the hydrophilic carrier during the lifetime of the implant.

FIG. 7 is a set of tables showing the experiment results of whether the coating solution comes off and salts are precipitated in the coating solution, according to the HEPES concentration in sections a, b, and c of FIG. 6.

MODES OF THE INVENTION

Hereinafter, embodiments of the present invention will be described in detail with reference to the attached drawings so that those skilled in the art can easily implement the present invention.

However, the present invention may be implemented in many different forms and is not limited to the embodiments described herein. In addition, parts indicated with the same reference numbers throughout the detailed description refer to the same components.

Hereinafter, specific embodiments of an ampoule for implant storage with a function of bidirectional humidity maintenance according to the present invention will be described in detail with reference to the attached drawings.

Figure 1:
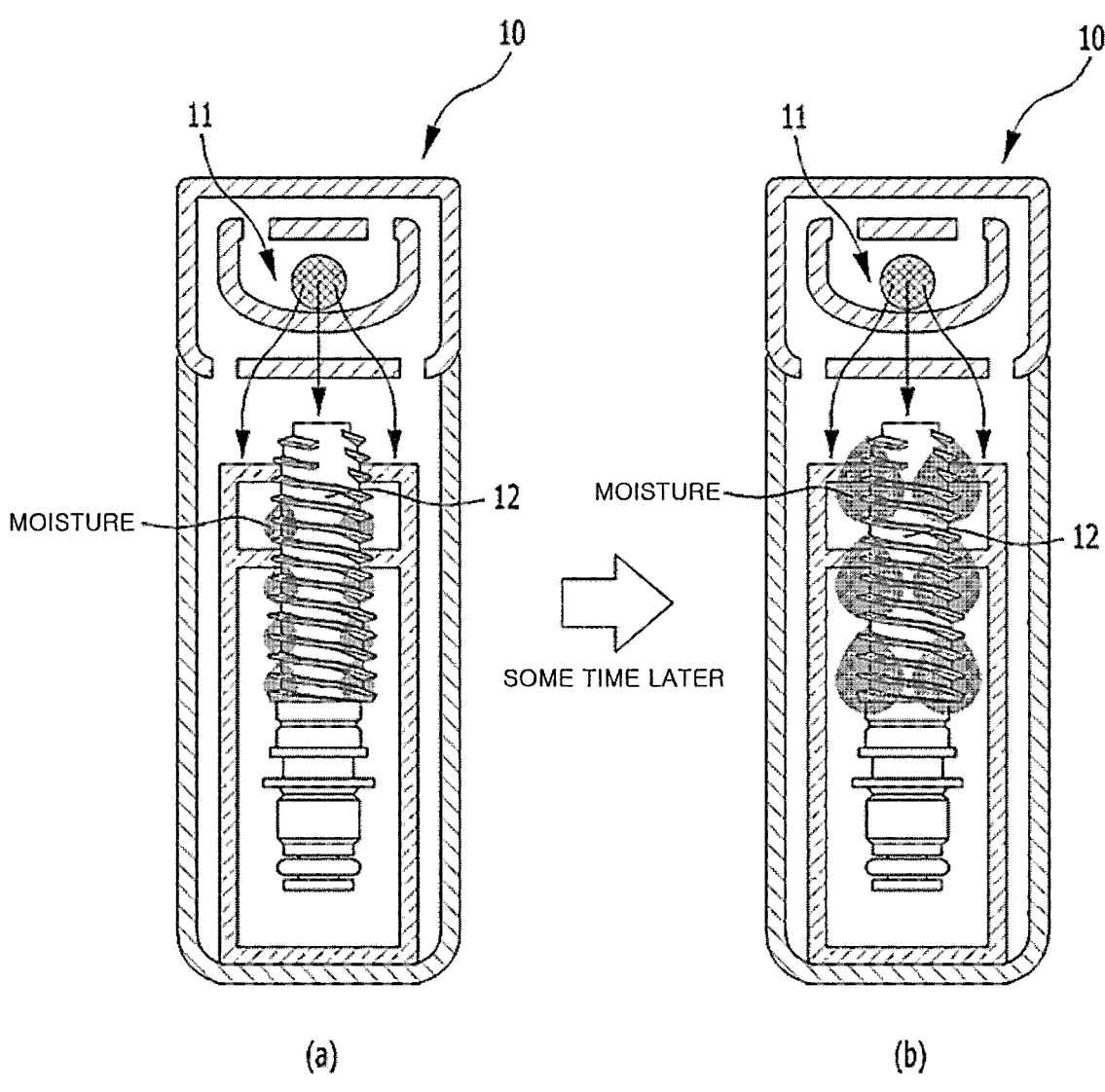
FIG. 1 is exemplary views illustrating unidirectional moisture supply from the moisture source to the implant surface in an existing ampoule for implant storage.
Figure 2:
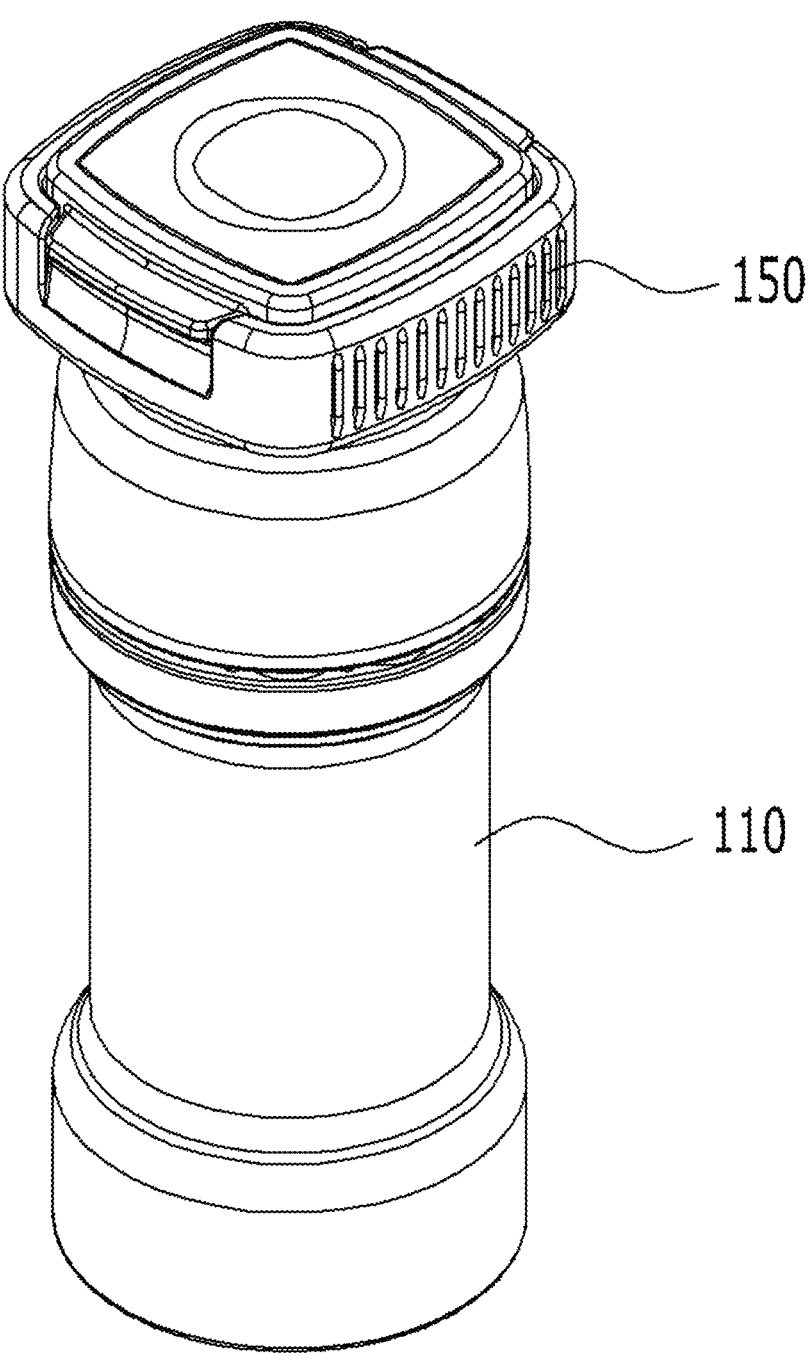
FIG. 2 is a sectional view of the structure of an ampoule for implant storage with a function of bidirectional humidity maintenance according to the present invention.
Figure 3:
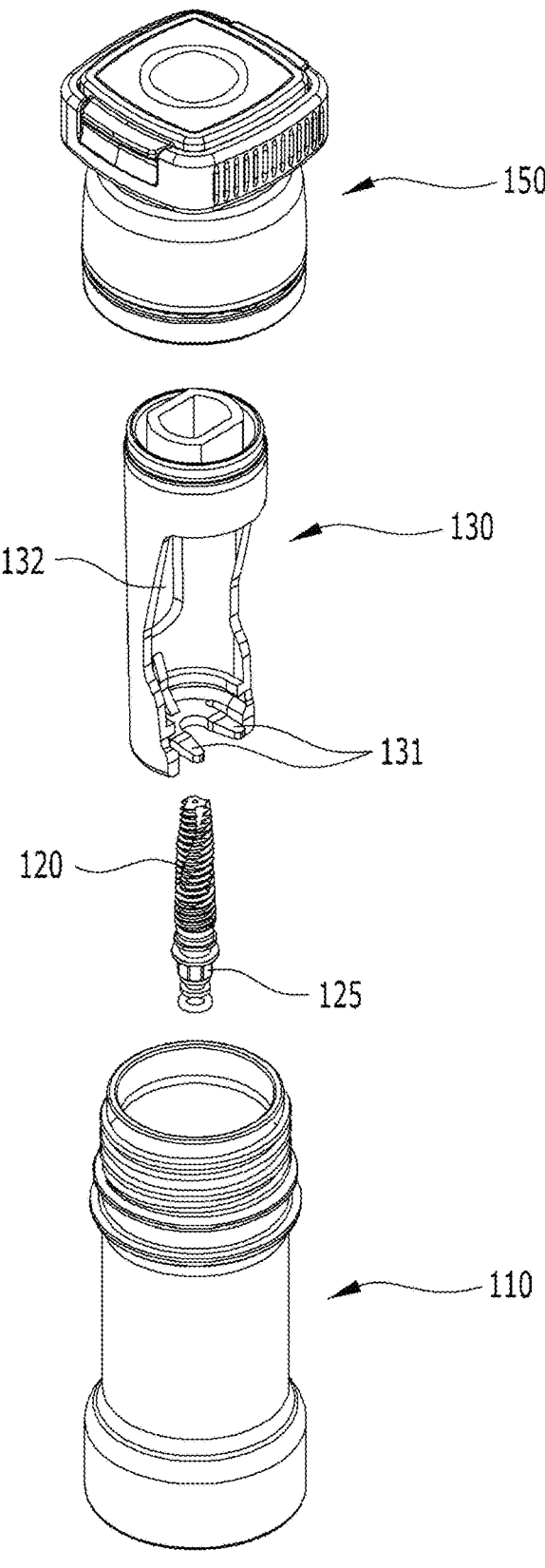
FIG. 3 is an exploded perspective view of FIG. 2.
Figure 4:
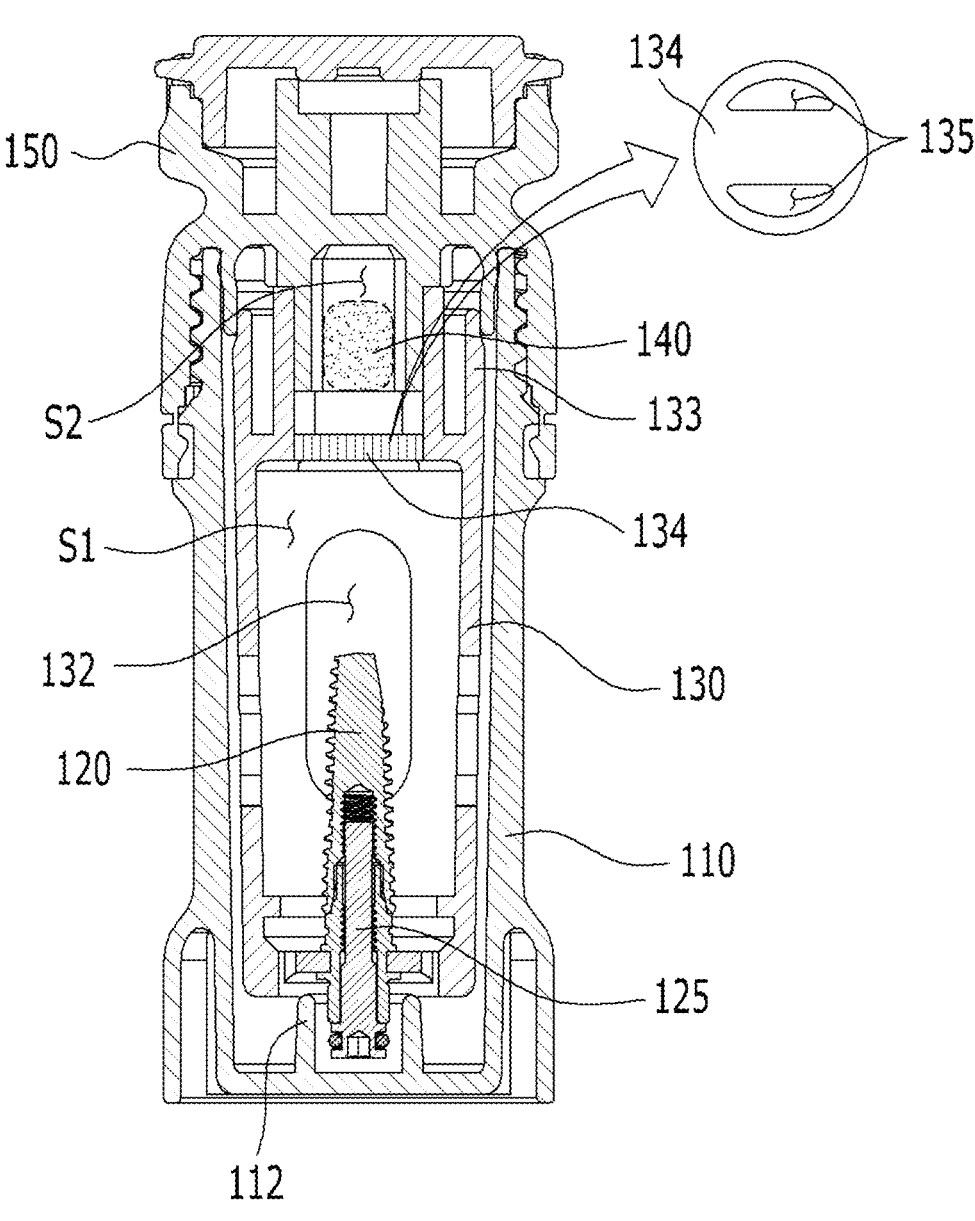
FIG. 4 is a cross-sectional view of FIG. 2.
Figure 5:
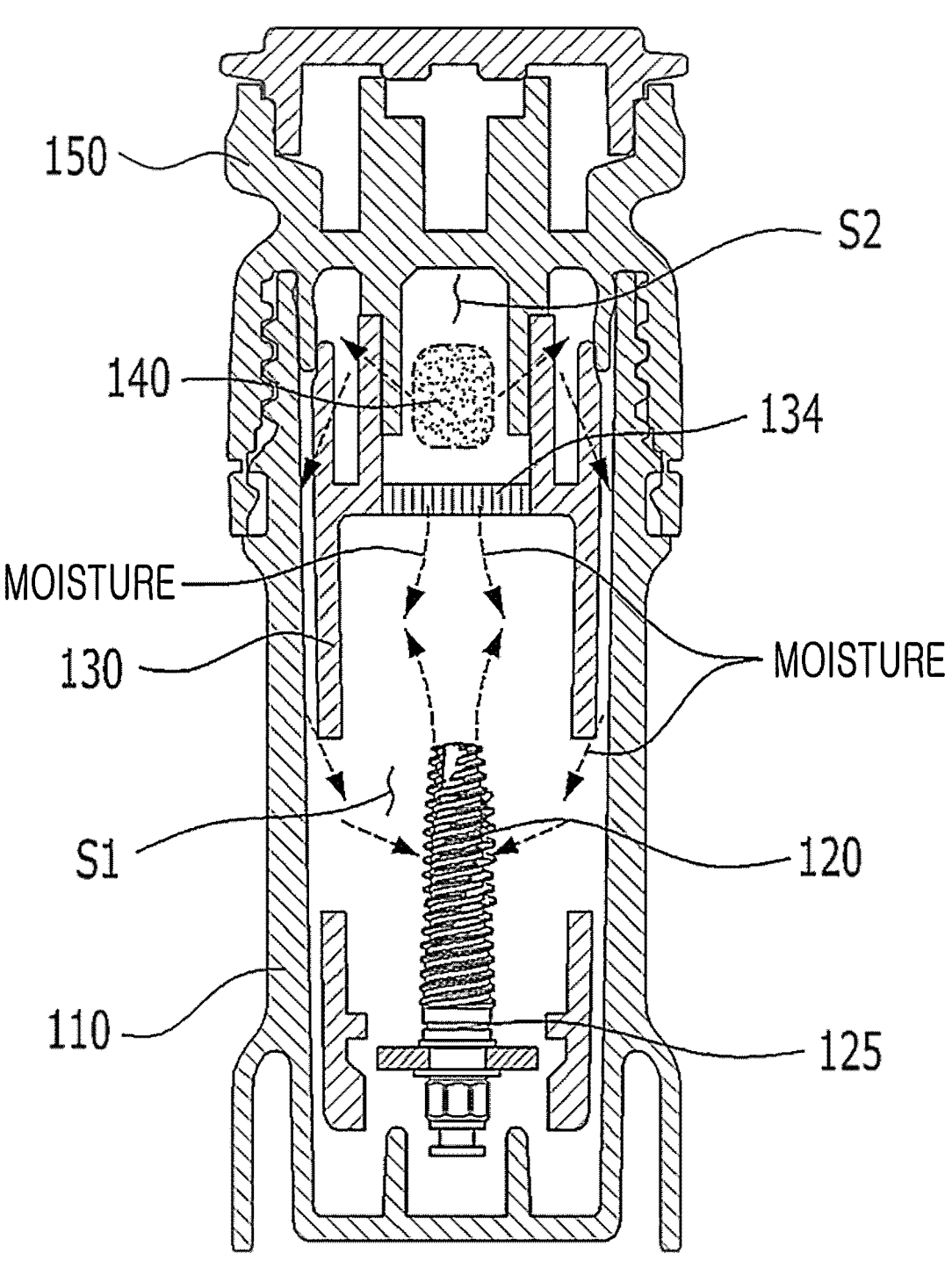
FIG. 5 is a view illustrating the moisture balance achieved through bidirectional moisture supply between a hydrophilic carrier and the implant surface.

FIG. 2 is a perspective view of the structure of an ampoule for implant storage with a function of bidirectional humidity maintenance according to the present invention, FIG. 3 is an exploded perspective view of FIG. 2, and FIG. 4 is a cross-sectional view of FIG. 2. FIG. 5 is a view illustrating the moisture balance achieved by bidirectional moisture supply between a hydrophilic carrier and the implant surface in the ampoule.

Referring to FIGS. 2 to 5, an ampoule 100 for implant storage with a function of bidirectional humidity maintenance according to the present invention includes an ampoule container 110, which is coupled to an ampoule cap 150, a separator 134, which separates the space inside the ampoule container 110 into a first space S1 on the lower side of the container and a second space S2 on the upper side of the container, an implant 120, which is accommodated in the first space S1, and a hydrophilic carrier 140, which is accommodated in the second space S2 and contains a hydrophilic solution.

A cylinder 130, to which the implant 120 is fixed, may be accommodated in the ampoule container 110. The ampoule cap 150 may be screw-coupled to the top of the ampoule container 110.

The ampoule container 110 may be sealed airtight when it is coupled to the ampoule cap 150. In some cases, the ampoule container 110 itself may be sealed airtight. In this case, the airtight sealing of the ampoule container 110 may include cases of both one-time sealing or repeated sealing.

The implant 120 may be pre-mounted on a mounting unit 125 and fixed to the bottom of the cylinder 130 through the pre-mounted structure. In this case, the mounting unit 125 may include a mount that is inserted and coupled to the implant 120 on one side and engages with a rotary tool on the other side, a screw shaft, which passes through the mount and is coupled to the implant 120, and an O-ring, which is coupled to one end of the screw shaft.

A holder 131 configured to hold the implant 120 is provided at the bottom of the cylinder 130, and since a portion of the mounting unit 125, which is coupled with the implant 120, is fitted into the holder 131, the implant 120 may be mounted on the holder 131.

An upper end 133 of the cylinder 130 may be press-fitted and fixed into the ampoule cap 150, and the lower end may be mounted on protrusions 112 protruding upward from the bottom of the ampoule container 110. In this case, the lower end of the mounting unit 125 coupled to the implant 120 may be inserted between the protrusions 112.

On one side of the cylinder 130, there is an opening 132 through which the inside and outside of the cylinder 130 may communicate. The opening 132 is formed to have a window-like structure, in which a portion of the body of the cylinder 130 adjacent to the implant 120 is cut out, so that it is possible to identify the shape and structure of the implant 120 through the opening 132 space from outside the ampoule container 110.

In this case, the implant 120 needs to remain sterile because it is placed in the alveolar bone tissue of the human body, and in order to prevent the implant 120 from being contaminated or damaged while the ampoule is transported and opened, it is desirable to maintain the surface of the implant 120 in a super hydrophilic state that prevents the formation of water droplets.

In addition, the ampoule container 110 may be injection molded into a cylindrical shape composed of transparent cyclic olefin copolymer (COC) materials in order to accommodate the cylinder 130 to which the implant 120 is fixed.

Meanwhile, based on the separator 134, the internal space of the ampoule container 110 may be divided into two areas: a first space S1 on the lower side in which the implant 120 is accommodated, and a second space S2 on the upper side in which the hydrophilic carrier 140 is accommodated.

Specifically, the separator 134 is a plate structure with a certain thickness and may separate the interior of the cylinder 130 into a first space S1 and a second space S2. At least one through hole 135, through which vaporized moisture passes, may be formed in the separator 134 to allow moisture to move between the first space S1 and the second space S2. Preferably, as shown in FIG. 4, two through holes 135 having a crescent shape may be provided in a symmetrical form in the disk-shaped separator 134.

The separator 134 may be composed of a separation membrane made of a porous material. The porous material forming the separation membrane may be one or more materials selected from the group consisting of polyvinylidene fluoride (PVDF), polyether sulfone (PES), mixed cellulose esters (MCE), cellulose acetate, nitrocellulose, polycarbonate, polytetrafluoroethylene (PTFE), polypropylene (PP), polyvinyl chloride (PVC), nylon, and glass and quartz fiber.

The implant 120 is accommodated in the first space S1 separated by the separator 134, and the implant 120, which is accommodated in the first space S1, may be mounted on the holder 131 at the bottom of the cylinder 130 through the mounting unit 125, which is coupled to the bottom of the implant 120.

Meanwhile, when the implant surface has micro-level roughness, the surface area increases and osseointegration of the implant increases, but while stored before the implant procedure, the contamination of the implant also increases in proportion to the surface area due to airborne contaminants.

For example, carbon contaminants in the air, such as carbon dioxide and organic carbon, may be irreversibly adsorbed onto the implant surface, making the implant surface hydrophobic. When an implant with a hydrophobic surface is transplanted in the body, various proteins in the blood cannot attach to the implant surface and biocompatibility may decrease, causing problems in osseointegration and inducing inflammatory reactions due to contaminants. Thus, a hydrophilic coating layer is formed on the implant surface to prevent the surface from becoming hydrophobic due to the adsorption of contaminants.

For example, a hydrophilic coating layer may be formed on at least a portion of the surface of the implant 120, preferably on a portion of the surface of the implant 120, which is placed in the alveolar bone of the human body and comes in contact with biological tissue.

The hydrophilic coating layer, which is formed on the surface of the implant 120, may be formed as a coating layer of a mixed solution containing an organic pH buffering material and/or an inorganic pH buffering material, or containing an organic zwitterionic buffering material having a sulfonic group.

The organic pH buffering material may have a pKa of 8.0 or more and may be one or more buffering materials selected from AMPD, ammonia, bicine, glycine, glycylglycine, tris, tricine, and taurine. The inorganic pH buffering material may be at least one buffering material selected from NaOH, KOH, $Ca(OH)_2$, $Ba(OH)_2$, $Al(OH)_3$, and $Sr(OH)_2$, which has a hydroxyl group. The organic zwitterionic buffering material having a sulfonic group contained in the mixed solution may be a buffering material containing at least one of BES, HEPES, MOPS, and TES.

The above-described materials not only prevent the surface of the implant 120 from becoming hydrophobic, but also have the property of absorbing moisture, thereby effectively absorbing moisture supplied from the hydrophilic carrier 140.

However, although the hydrophilic coating layer maintains the hydrophilicity of the implant surface for a certain period of time, there is a possibility that the coating layer may be destroyed when used in a dry environment for a long time. For this reason, it is desirable to maintain the surrounding environment of the implant in a proper humid state, but storing the implant in excessively high humidity state for a long time may cause the coating layer to deteriorate or have a negative effect on other portions of the implant where the coating layer is not formed. Therefore, it is most important to maintain the hydrophilic coating layer on the implant surface in a proper wet state.

To this end, in the present invention, a hydrophilic coating layer containing one or more organic zwitterionic buffering materials having a sulfonic acid group is formed on at least a portion of the surface of the implant 120 accommodated in the first space S1, and the hydrophilic carrier 140 accommodated in the second space S2 includes one or more organic zwitterionic buffering materials, like the hydrophilic coating layer on the surface of the implant 120, so that a moisture balance between the hydrophilic coating layer on the surface of the implant 120 and the hydrophilic carrier 140 is achieved.

Here, as a buffering material to form the hydrophilic coating layer on the surface of the implant 120, one or more buffering materials selected from the group consisting of ACES, BES, CHES, HEPES, MOPS, PIPES, and TES, which are organic zwitterionic buffering materials having a sulfonic acid group, may be used. Preferably, HEPES, which has a moisture-absorbing property, may be used as an organic zwitterionic buffering material that may be contained in the hydrophilic coating layer on the surface of the implant 120. The organic zwitterionic buffering material having a sulfonic acid group may be mixed with a hydrophilic buffering material.

Referring to FIGS. 2 to 5 again, the hydrophilic carrier 140 may be accommodated in the second space S2. The hydrophilic carrier 140 is configured to include moisture (water) and one or more organic zwitterionic buffering materials having a sulfonic acid group and may be configured to supply vaporized moisture to the hydrophilic coating layer on the surface of the implant 120 accommodated in the first space S1 within the limited space in the ampoule container 110.

That is, the hydrophilic carrier 140 accommodated in the second space S2 may supply moisture to the hydrophilic coating layer on the surface of the implant 120 located in the first space S1. In this case, the hydrophilic carrier 140 may be composed of a highly hygroscopic polymer material that can contain moisture.

As a highly hygroscopic polymer material that may be used as the hydrophilic carrier 140, one or more materials selected from the group consisting of polyacrylic acid, polyvinyl alcohol, polyethylene glycol, carboxymethyl cellulose, and hyaluronic acid may be used.

In an embodiment of the present invention, an example is presented in which the hydrophilic carrier 140 is composed of one or a plurality of beads made of polyacrylic acid, a highly hygroscopic polymer material.

In addition, the hydrophilic carrier 140 composed of polyacrylic acid may include moisture (water) and one or more organic zwitterionic buffering materials having a sulfonic acid group.

In this case, the organic zwitterionic buffering material that may be included in the hydrophilic carrier 140 may be one or more buffering materials selected from the group consisting of ACES, BES, CHES, HEPES, MOPS, PIPES, and TES. HEPES, which has a moisture-absorbing property, may be preferably used, but is not limited thereto.

A moisture balance may be maintained by spontaneous moisture movement in both directions between the hydrophilic coating layer on the surface of the implant 120 and the hydrophilic carrier 140 by including HEPES, a hydrophilic buffering material that may attract moisture, in both the hydrophilic coating layer on the surface of the implant 120 and the hydrophilic carrier 140.

When the hydrophilic carrier includes only moisture and does not contain the hydrophilic buffering material proposed in the present invention in the highly hygroscopic polymer material, there is a problem in that an excessive amount of moisture supplied from the hydrophilic carrier to the surface of the implant 120 causes the coating solution on the surface of the implant 120 to come off. This is because even though a trace amount of moisture may be absorbed due to the highly hygroscopic polymer material of the hydrophilic carrier, the amount absorbed through the hydrophilic coating layer on the surface of the implant 120 is much greater, and the absorption rate is also fast.

When the absolute amount of moisture contained in the highly hygroscopic polymer material is reduced to prevent excessive moisture supply from the highly hygroscopic polymer material to the surface of the implant 120, there is a problem in that salts of the coating solution are precipitated on the surface of the implant 120 due to an insufficient amount of moisture being supplied to the implant 120. Considering that implants are typically stored for several years, this problem becomes more serious as the storage period increases.

In the present invention, by including one or more organic zwitterionic buffering materials having a sulfonic acid group in the hydrophilic carrier disposed in the second space, the amount and/or speed of moisture moving between the hydrophilic carrier in the second space and the surface of the implant 120 in the first space may be actively controlled.

In various embodiments of the present invention, a second concentration of the hydrophilic buffering material contained in the hydrophilic carrier in the second space is lower than a first concentration of the hydrophilic buffering material of the hydrophilic coating layer formed on the implant surface in the first space, and thus moisture may be slowly supplied from the hydrophilic carrier to the implant surface. At this time, the second concentration may be set to a predetermined ratio with respect to the first concentration. In the present invention, the rate at which moisture is supplied from the hydrophilic carrier to the implant surface may be actively controlled by adjusting the ratio of the second concentration of the hydrophilic buffering material contained in the hydrophilic carrier and the first concentration of the hydrophilic buffering material on the implant surface.

As shown in FIG. 5, the moisture vaporized from the hydrophilic coating layer on the surface of the implant 120 and the hydrophilic carrier 140 freely moves between the first space S1 and the second space S2 while passing through the gap between the cylinder 130 and the ampoule cap 150 and the through hole 135 formed in the separator 134, and thus the humidity between the first space S1 and the second space S2 may be maintained in a dynamic equilibrium state.

Therefore, even when the hydrophilic carrier 140 is separated by the separator 134 and accommodated in the second space S2, the humidity of the first space S1 may also be dynamically adjusted by the hydrophilic carrier 140, and thus the hydrophilic carrier 140 may reversibly discharge or absorb vaporized moisture.

Meanwhile, when the ampoule 100 is not sealed in a completely airtight state, moisture in the ampoule 100 gradually decreases due to the gap between the ampoule container 110 and the ampoule cap 150, and as time passes, moisture contained in the hydrophilic coating layer on the surface of the implant 120 may evaporate, and salts of the coating solution may be precipitated on the surface of the implant 120.

When the ampoule 100 is stored for a long time, moisture is required to continuously move from the hydrophilic carrier 140 to the surface of the implant 120 in order to prevent the precipitation of salts of the coating solution due to a decrease in moisture on the surface of the implant 120.

In an exemplary embodiment, both the hydrophilic coating layer on the surface of the implant 120 and the hydrophilic carrier 140 include HEPES, which may attract moisture, in order to maintain the moisture balance between the surface of the implant 120 and the hydrophilic carrier 140, but when the first concentration of HEPES contained in the surface of the implant 120 is greater than the second concentration of HEPES contained in the hydrophilic carrier 140, moisture may be continuously supplied from the hydrophilic carrier 140 to the surface of the implant 120, thereby suppressing the precipitation of salts of the coating solution on the surface of the implant 120.

In the present invention, the period during which the moisture balance is maintained (such as the implant lifetime) may be determined depending on the amount of solution (water and/or hydrophilic buffering material) initially contained in the highly hygroscopic polymer material of the hydrophilic carrier.

In various embodiments of the present invention, based on the period during which the moisture balance is maintained by bidirectional moisture supply between the hydrophilic coating layer on the surface of the implant 120 and the hydrophilic carrier 140, the ratio of the concentration of the hydrophilic buffering material contained in the hydrophilic carrier 140 and the concentration of the hydrophilic buffering material contained in the hydrophilic coating layer on the surface of the implant 120 may be determined.

In an exemplary embodiment, during bidirectional moisture supply between the hydrophilic carrier 140 and the implant surface, the ratio of the HEPES concentration of the hydrophilic carrier 140 and the HEPES concentration of the implant surface may be selected so that the moisture supply rate from the hydrophilic carrier 140 is greater than or equal to the moisture supply rate from the implant surface. In addition, considering the contribution of moisture absorption through the highly hygroscopic polymer material contained in the hydrophilic carrier 140, the ratio of the HEPES concentration of the hydrophilic carrier 140 and the HEPES concentration of the implant surface may be selected so that the moisture supply rate from the hydrophilic carrier 140 is greater than the moisture supply rate from the implant surface. Here, HEPES was used as an example among hydrophilic buffering materials, but the hydrophilic buffering material is not limited thereto.

In an exemplary embodiment, in order to minimize the amount of the coating solution coming off the surface of the implant 120 and the precipitation of salts of the coating solution due to moisture evaporation by maintaining a moisture balance between the surface of implant 120 and the hydrophilic carrier 140, the ratio of the HEPES concentration of the hydrophilic carrier 140 to the HEPES concentration of the surface of the implant 120 may be within the range of 0.5:1 to 1:1.

When the ratio of the HEPES concentration of the hydrophilic carrier 140 to the HEPES concentration of the surface of the implant 120 is less than 0.5:1, the rate at which moisture is supplied from the hydrophilic carrier 140 to the surface of the implant 120 is too fast, so that excessive moisture is supplied in a short period of time, and the coating solution is not maintained for the lifetime of the implant and comes off. In addition, when the ratio of the HEPES concentration of the hydrophilic carrier 140 to the HEPES concentration of the surface of the implant 120 is greater than 1:1, moisture moves from the surface of the implant 120 to the hydrophilic carrier 140, causing precipitation of salts on the implant surface.

The range of the ratio of the HEPES concentration of the hydrophilic carrier 140 to the HEPES concentration of the surface of implant 120 derived above is the optimal HEPES concentration ratio derived from an experiment that evaluated moisture balance stability for 3 years, which is the lifetime of the implant, and FIGS. 6 and 7 show the results of the experiment.

FIG. 6 is a graph of comparing the moisture balance stability for 3 years (implant lifetime) according to the HEPES concentration of the hydrophilic carrier, and FIG. 7 shows a set of tables showing the results of testing whether the coating solution comes off and salts are precipitated in the coating solution, according to the HEPES concentration in sections a and b of FIG. 6. The section where the concentration ratio exceeds 1:1 was set as section c.

As shown in the graph of FIG. 6 and the table of FIG. 7, in section "a" where the concentration of HEPES contained in the hydrophilic carrier 140 was relatively low, excessive moisture was supplied from the hydrophilic carrier 140 to the surface of the implant 120, and thus the coating solution on the surface of the implant 120 came off. In other words, in section "a" where the HEPES concentration was low, moisture balance stability was not maintained, and thus the coating solution came off the surface of the implant 120 within one year.

Conversely, in section "c" where the HEPES concentration was relatively high, more moisture moved from the surface of implant 120 to the hydrophilic carrier 140, resulting in the precipitation of salts of the coating solution on the surface of the implant 120 due to moisture evaporation. In other words, in section "c" where the HEPES concentration was high, moisture balance stability was not maintained, moisture contained in the coating solution on the surface of the implant 120 in turn evaporated within one year, and thus salt components in the coating solution were precipitated.

Figure 8:
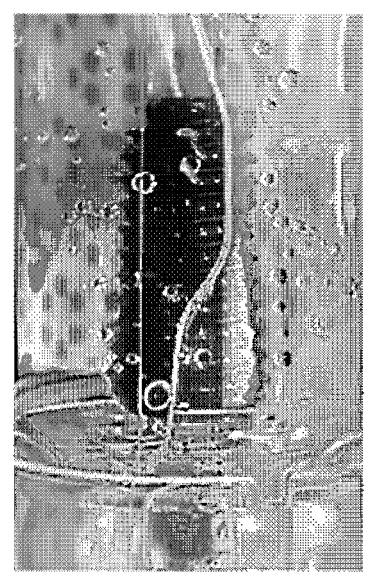
FIG. 8 is a set of photographs of the coating solution coming off the implant surface, salts precipitated on the implant surface, and a state in which the coating solution does not come off and salts are not precipitated due to moisture balance between the hydrophilic carrier and the implant surface.
Figure 8:
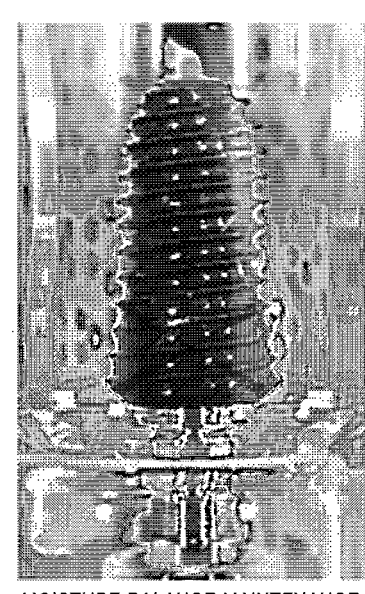
Figure 8:
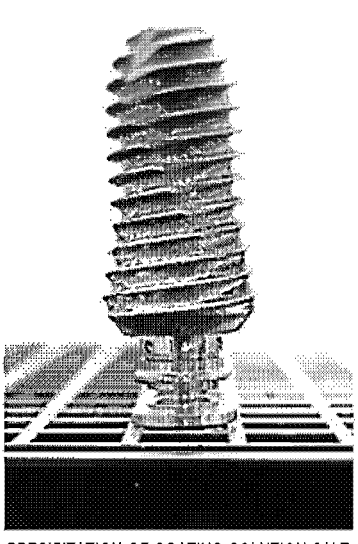

These results may be visually confirmed from the photographs shown in FIG. 8. In the case of section "a" where HEPES concentration of the hydrophilic carrier 140 was low, due to excessive moisture supply from the hydrophilic carrier 140 to the surface of the implant 120, the coating solution of the surface of the implant 120 came off, and as shown in FIG. 8A, as the coating solution was scattered on the interior surface of the ampoule container 110, the inside of the ampoule looked as if it was contaminated, thereby causing appearance-related quality to be degraded.

Conversely, in section "c" where the HEPES concentration of the hydrophilic carrier 140 was high, more moisture moved from the surface of the implant 120 to the hydrophilic carrier 140, and due to moisture evaporation, salt components in the coating solution were precipitated on the surface of the implant 120 as shown in FIG. 8C. As a result, harmful residues may remain in the human body when the implant 120 is implanted in the alveolar bone, and weaken the binding force.

However, referring to FIGS. 6 and 7, in the case of the HEPES concentration of the hydrophilic carrier 140 in section "b," as a moisture balance was achieved between the hydrophilic carrier 140 and the surface of the implant 120, the moisture balance stability significantly increased (66.7% or more), and thus, the coating solution on the surface of the implant 120 did not come off and salts were not precipitated for 2 years or more. As it can be seen from the photograph shown in FIG. 8B, the coating solution on the implant surface did not come off and was not scattered on the interior surface of the ampoule container 110, and thus the appearance-related quality of the ampoule 100 was improved.

As described above, conventionally, since excessive moisture was supplied from the hydrophilic carrier to the implant surface, the implant surface contained excessive moisture, causing the coating solution to come off the implant surface. In this state, when the ampoule is delivered or accidentally dropped, moisture is scattered inside the ampoule due to external impacts, making it difficult to maintain the hydrophilic function of the implant surface, and the scattering of moisture in the interior surface of the ampoule causes a degradation in the appearance-related quality of the product, which can be observed with the naked eye, thereby reducing product reliability.

As described above, in the present invention, the hydrophilic carrier 140 includes the same hygroscopic buffering material that is contained on the surface of the implant 120. At this time, the concentration of the hygroscopic buffering material contained on the surface of the implant 120 is set to be greater than that of the hygroscopic buffering material contained in hydrophilic carrier 140, so that moisture may be gradually supplied from the hydrophilic carrier 140 to the surface of the implant 120. Preferably, the ratio of the concentration of the hygroscopic buffering material contained in the surface of the implant 120 to the concentration of the hygroscopic buffering material contained in the hydrophilic carrier 140 is set in the range of 1:X to 1:Y, so that a dynamic moisture balance may be maintained due to bidirectional moisture supply between the hydrophilic carrier 140 and the surface of the implant 120, thereby preventing problems such as the coating solution coming off the implant surface or the precipitation of salt components.

Conventionally, since the hygroscopicity of moisture sources containing pure water was very low, unidirectional supply of moisture to the implant surface coated with a material with hydration ability was achieved. In other words, when an external impact was applied to the ampoule due to excessive moisture supply to the implant surface, the coating solution containing moisture on the implant surface scattered, causing the appearance-related quality of the ampoule product to degrade.

Conversely, since the present invention allows both the implant surface and the hydrophilic carrier to have the property of actively attracting water by including a material with hydration ability, instead of water, in the existing moisture supply source containing pure water, excessive moisture supply to the implant surface, which may occur due to the existing unidirectional moisture supply, is suppressed and optimal conditions for maintaining a moisture balance are created.

Although preferred embodiments of the present invention have been described above, the scope of the present invention is not limited to these specific embodiments, and those skilled in the art can make appropriate changes within the scope described in the claims of the present invention.

EXPLANATION OF SYMBOLS

100: Ampoule 110: Ampoule container
120: Implant 125: Mounting unit
130: Cylinder 131: Holder
132: Opening 134: Separator
135: Through hole 140: Hydrophilic carrier
150: Ampoule cap

The invention claimed is:

1. An ampoule for implant storage with a function of bidirectional humidity maintenance, the ampoule comprising:

an ampoule container coupled to an ampoule cap;

a separator configured to separate the inside of the ampoule container into a first space and a second space and having at least one through hole that allows moisture to move between the first space and the second space;

an implant accommodated in the first space and having a hydrophilic coating layer formed on at least a portion of the surface thereof; and a hydrophilic carrier accommodated in the second space and containing a buffering material and moisture, wherein as the buffering material of the hydrophilic carrier supplies moisture to the hydrophilic coating layer on the implant surface or absorbs moisture from the hydrophilic coating layer on the implant surface, a moisture balance is maintained between the hydrophilic coating layer on the implant surface and the hydrophilic carrier, wherein the hydrophilic coating layer on the implant surface contains the buffering material, and the concentration of the buffering material contained in the hydrophilic carrier is lower than that of the buffering material contained in the hydrophilic coating layer on the implant surface.

2. The ampoule of claim 1, wherein the hydrophilic carrier is formed by supporting the buffering material and moisture on a highly hygroscopic polymer material.

3. The ampoule of claim 2, wherein the highly hygroscopic polymer material is one or more polymer materials selected from polyacrylic acid, polyvinyl alcohol, polyethylene glycol, carboxymethyl cellulose, and hyaluronic acid.

4. The ampoule of claim 1, wherein the buffering material contained in the hydrophilic carrier is one or more organic zwitterionic buffering materials selected from the group consisting of ACES, BES, CHES, HEPES, MOPS, PIPES, and TES.

5. The ampoule of claim 4, wherein the buffering material contained in the hydrophilic coating layer on the implant surface is one or more organic zwitterionic buffering materials selected from the group consisting of ACES, BES, CHES, HEPES, MOPS, PIPES, and TES.

6. The ampoule of claim 5, wherein the ratio of the concentration of the buffering material contained in the hydrophilic coating layer on the implant surface to the concentration of the buffering material contained in the hydrophilic carrier ranges from 1:0.5 to 1:1.

7. An ampoule for implant storage with a function of bidirectional humidity maintenance, the ampoule comprising:

an ampoule container capable of being sealed airtight;

a separator configured to separate the inside of the ampoule container into a first space and a second space and having at least one through hole that allows moisture to move between the first space and the second space; and a hydrophilic carrier accommodated in the second space and configured to supply moisture to a hydrophilic coating layer formed on an implant surface, wherein as the hydrophilic coating layer on the implant surface and the hydrophilic carrier contain one or more organic zwitterionic buffering materials having a sulfonic acid group, a moisture balance is maintained between the hydrophilic coating layer on the implant surface and the hydrophilic carrier, and wherein the hydrophilic coating layer on the implant surface contains the one or more organic zwitterionic buffering materials, and the concentration of the one or more organic zwitterionic buffering materials contained in the hydrophilic carrier is lower than that of the one or more organic zwitterionic buffering materials contained in the hydrophilic coating layer on the implant surface.

8. The ampoule of claim 7, wherein the hydrophilic carrier is formed by supporting the buffering material and moisture on a highly hygroscopic polymer material.

9. The ampoule of claim 8, wherein the highly hygroscopic polymer material is one or more polymer materials selected from polyacrylic acid, polyvinyl alcohol, polyethylene glycol, carboxymethyl cellulose, and hyaluronic acid.

10. The ampoule of claim 7, wherein the buffering material contained in the hydrophilic carrier is one or more organic zwitterionic buffering materials selected from the group consisting of ACES, BES, CHES, HEPES, MOPS, PIPES, and TES.

11. The ampoule of claim 7, wherein the ratio of the concentration of the buffering material contained in the hydrophilic coating layer on the implant surface to the concentration of the buffering material contained in the hydrophilic carrier ranges from 1:0.5 to 1:1.

\* \* \* \* \*